United States Patent [19]

Sperry et al.

[11] 4,426,023

[45] Jan. 17, 1984

[54] CLEANING ASSEMBLY FOR A FOAM DISPENSING APPARATUS

[75] Inventors: Charles R. Sperry, Westport; Harry F. Riley, Southport, both of Conn.

[73] Assignee: Sealed Air Corporation, Fair Lawn, N.J.

[21] Appl. No.: 241,013

[22] Filed: Mar. 6, 1981

[51] Int. Cl.³ .................... B67D 1/08; B67D 5/60; B05B 15/02
[52] U.S. Cl. .................................. 222/132; 222/145; 222/148; 239/112; 366/138
[58] Field of Search ............... 222/148, 132, 145; 366/138; 239/112–118

[56] References Cited

U.S. PATENT DOCUMENTS

| | | | |
|---|---|---|---|
| 3,125,252 | 3/1964 | Heiss et al. | |
| 3,687,370 | 8/1972 | Sperry | 239/117 |
| 3,690,556 | 9/1972 | McCain | 239/112 |
| 3,786,990 | 1/1974 | Hagfors | 239/112 |
| 3,876,114 | 4/1975 | Hicks et al. | 222/148 |
| 3,876,144 | 4/1975 | Wadden et al. | 239/106 |
| 3,908,869 | 9/1975 | Little | 222/148 |
| 3,945,569 | 3/1976 | Sperry | 239/117 |
| 4,023,733 | 5/1977 | Sperry | 239/117 |
| 4,043,486 | 8/1977 | Wisbey | 222/134 |
| 4,117,551 | 9/1978 | Brooks et al. | 366/162 |
| 4,129,231 | 12/1978 | Larson | 222/145 |
| 4,200,232 | 4/1980 | Fraley et al. | 239/112 |
| 4,285,446 | 8/1981 | Rapp et al. | 220/70 |

FOREIGN PATENT DOCUMENTS

| | | |
|---|---|---|
| 1015858 | 1/1966 | United Kingdom . |
| 1336997 | 11/1973 | United Kingdom . |
| 1450170 | 9/1976 | United Kingdom . |
| 1475771 | 6/1977 | United Kingdom . |
| 1494828 | 12/1977 | United Kingdom . |
| 2030894 | 4/1980 | United Kingdom . |

Primary Examiner—Robert B. Reeves
Assistant Examiner—Russell D. Stormer
Attorney, Agent, or Firm—Lerner, David, Littenberg, Krumholz & Mentlik

[57] ABSTRACT

A cleaning assembly is provided for a foam dispensing apparatus which intermittently supplies a solvent to the discharge port of the dispensing apparatus for removal of accumulations of dispensed foam therefrom. The cleaning assembly is constructed from a body having a wall forming an opening extending therethrough in communication with the discharge port of the dispensing apparatus. At least one passageway is formed in the body for discharging the solvent from a supply thereof onto the face of the dispensing apparatus surrounding the discharge port.

10 Claims, 6 Drawing Figures

CLEANING ASSEMBLY FOR A FOAM DISPENSING APPARATUS

BACKGROUND OF THE INVENTION

The present invention relates in general to an apparatus for mixing and dispensing of synthetic foams, and more particularly, to a cleaning assembly for such apparatus which is adapted for intermittently removing accumulations of dispensed synthetic foam from the face of such apparatus in a region particularly overlying the discharge opening thereof.

As is well-known to those skilled in the art, the preparation of many synthetic foams, such as polyurethane foams, requires uniform mixing of liquid organic resins with polyisocyanates. In this regard, it is often desirable to dispense the polyisocyanate resin mixture into a receptacle, such as a package and the like, before it is reacted to form the polyurethane foam, particularly, when attempting to build up a foam structure around some object as in packaging. One particular problem with the handling of polyurethane foam material is that the organic resin and polyisocyanate tend to react relatively rapidly, and can accumulate over the external surface portions of the dispensing apparatus. The accumulated foam is then most difficult to remove. This problem of rapid setting of the polyurethane foam reactants is particularly critical when the dispensing apparatus is used intermittently.

Often, it is desirable to incorporate the dispensing apparatus in an automatic system for packaging objects. In this regard, the dispensing apparatus is located at one or more work stations overlying a conveyor belt and positioned in a vertical downwardly facing direction. Objects to be packaged are indexed along the conveyor belt by a control system and subsequently stopped at each work station underlying the dispensing apparatus. The control system activates the dispensing apparatus which fills the receptacle containing the object with polyurethane foam so as to incapsulate the object. Due to the vertical downwardly facing orientation of the dispensing apparatus and its intermittent use, the exterior surface of the dispensing apparatus is susceptible to accumulations of the polyurethane foam. In particular, the foam can accumulate on the face of the dispensing apparatus such that the discharge opening becomes partially blocked causing sputtering or complete failure of the dispensing apparatus. Once this condition has occurred, the dispensing apparatus must be cleaned prior to continued operation.

It is contemplated that the cleaning of the discharge opening of the dispensing apparatus can be accomplished by a variety of techniques. For example, mechanical wiping equipment can be installed at each work station for intermittently cleaning the face and discharge opening of the dispensing apparatus. However, such mechanical wiping equipment would generally be expensive to construct and require slowing down of the packaging operation to provide sufficient time for the wiping operation to be completed before continued use of the dispensing apparatus. In addition, the dispensing apparatus may be placed in a holster having a suitable solvent for the polyurethane foam between dispensing operations. However, the use of the holster is not suitable for use with an automatic system where the dispensing apparatus must be secured at a given work station for continuous intermittent use.

Accordingly, it can be appreciated that there is a need for a cleaning assembly adapted for use with a dispensing apparatus which is operative to intermittently remove accumulated foam from the discharge opening of the dispensing apparatus which would otherwise partially or completely prevent the satisfactory operation of the dispensing apparatus such as in an automatic foam dispensing system.

SUMMARY OF THE INVENTION

It is broadly an object of the present invention to provide a cleaning assembly for a foam dispensing apparatus which overcomes or avoids one or more of the foregoing disadvantages resulting from the use of the above-mentioned contemplated cleaning techniques and which fulfills the requirements for cleaning the discharge opening of a dispensing apparatus while secured in a work station thereof, for example, an automatic packaging system. Specifically, it is within the contemplation of the present invention to provide a cleaning assembly for a foam dispensing apparatus which intermittently provides a solvent to the discharge opening of the dispensing apparatus for removal of accumulations of dispensed foam therefrom.

A further object of the present invention is to provide a cleaning assembly which is adapted to intermittently clean the discharge opening of a dispensing apparatus and which eliminates the need for using expensive mechanical wiping equipment.

A still further object of the present invention is to provide a cleaning assembly for use in cleaning the discharge opening of a dispensing apparatus which is easy to install and economical to use.

A yet still further object of the present invention is to provide a cleaning assembly for use in an automatic foam dispensing system which will not interrupt the system operation.

In accordance with one embodiment of the present invention, there is provided a cleaning system for use with a fluid dispensing apparatus. The system includes a dispensing apparatus having a chamber from which a first fluid is to be discharged. A cleaning assembly is positioned adjacent the discharge opening of the dispensing apparatus through which the first fluid is discharged from the chamber. The cleaning assembly has an opening in communication with the discharge opening of the dispensing apparatus. Dispensing means are provided within the cleaning assembly for discharging a second fluid onto the discharge opening for causing the first fluid discharged from the chamber from accumulating thereon.

In accordance with another embodiment of the present invention, there is provided a cleaning assembly for use with a fluid dispensing apparatus. The cleaning assembly includes dispensing means positioned adjacent the face of the dispensing apparatus. The dispensing apparatus includes an opening in the face thereof in communication with a chamber in the dispensing apparatus from which a first fluid is discharged. The dispensing means is positioned for discharging a second fluid onto the face of the dispensing apparatus for causing the first fluid discharged from the chamber from accumulating thereon.

Further in accordance with the last mentioned embodiment, the dispensing means includes a plurality of passageways formed in the dispensing means, each passageway being in communication with the face of the dispensing apparatus for discharging the second fluid thereon.

Still further in accordance with the last mentioned embodiment, the cleaning assembly further includes means formed in the dispensing means in communication with each of the plurality of passageways for discharging the second fluid through each passageway onto the face of the dispensing apparatus.

Yet still further in accordance with the above embodiments, the first fluid includes a synthetic foam and the second fluid includes a solvent for such foam.

BRIEF DESCRIPTION OF THE DRAWINGS

The above description as well as further objects, features and advantages of the present invention will be more fully understood by reference to the following detailed description of a presently preferred, but nonetheless illustrative cleaning assembly for a foam dispensing apparatus in accordance with the present invention when taken in conjunction with the accompanying drawings, wherein.

DETAILED DESCRIPTION OF THE PREFERRED EMBODIMENT

Figure 1:
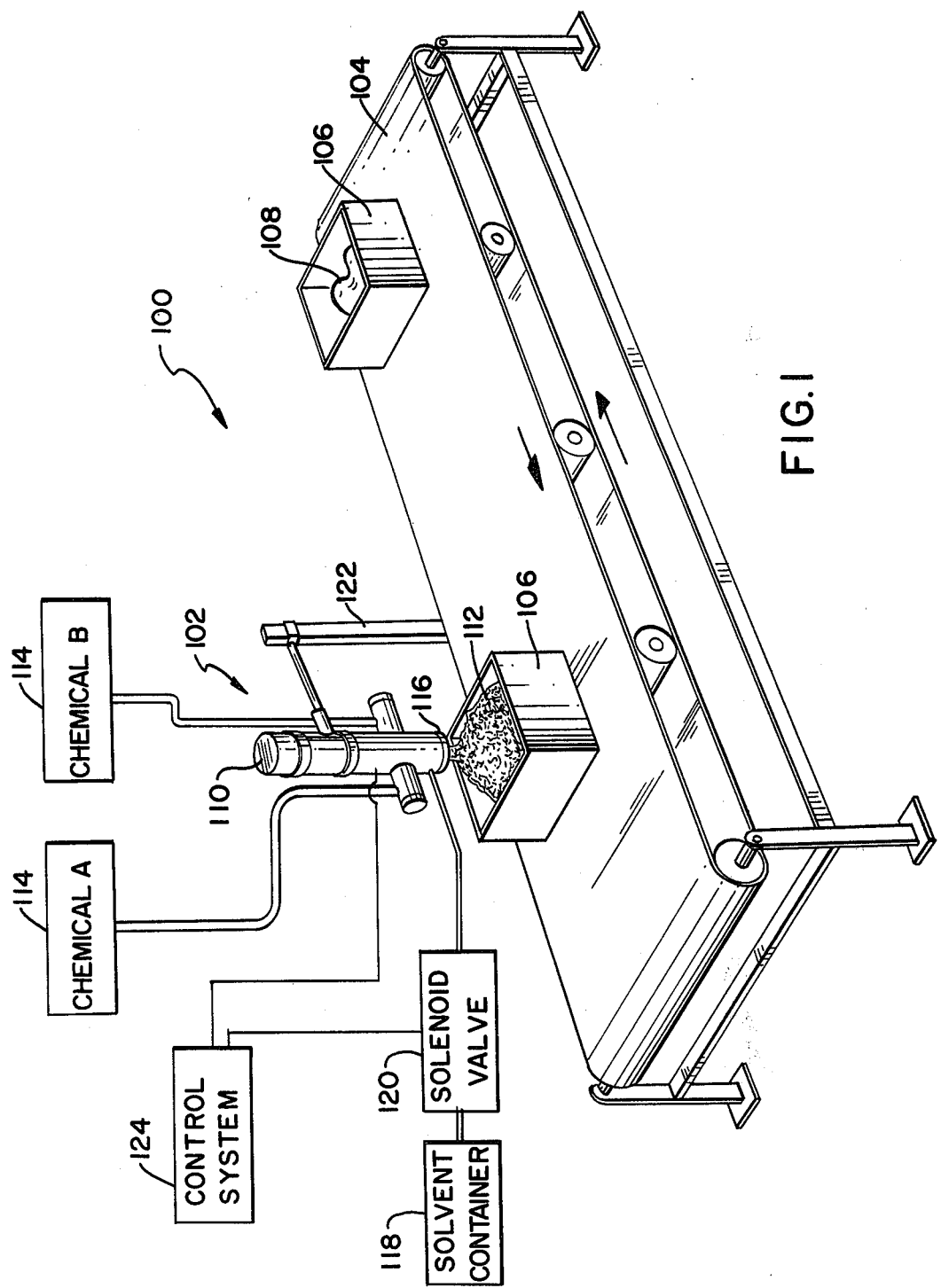
FIG. 1 is a perspective elevation of an automatic fluid dispensing system including a work station provided with a fluid dispensing apparatus having a cleaning assembly and control means for controlling the intermittent discharge of a solvent by the cleaning assembly at a desired interval for removing accumulated fluid therefrom.

Referring now to the drawings in which like reference characters represent like elements, there is shown in FIG. 1 an automatic foam dispensing system designated generally by reference character 100. The automatic foam dispensing system 100 includes at least one work station 102 located along a conveying apparatus 104. The conveying apparatus transfers receptacles 106 having an object 108 therein to be packaged from a remote location, to the work station 102.

Located at each work station 102 there is provided a dispensing apparatus 110 for mixing and dispensing of chemical reactants in forming a polyurethane foam 112. One type of dispensing apparatus 110 adapted for use in accordance with the present invention is disclosed and described in U.S. patent application Ser. No. 159,369, filed June 13, 1980, and assigned to the same assignee of the present invention. The construction and operation of the dispensing apparatus 110 in accordance with the above-mentioned Application will be discussed hereinafter.

The chemical reactants for the polyurethane foam 112 are dispensed from suitable containers 114, respectively containing a liquid organic resin designated as chemical A and a polyisocyanate designated as chemical B. The organic resin and polyisocyanate are mixed within a mixing chamber in the dispensing apparatus 110 to form the polyurethane foam 112 which is discharged therefrom.

Secured at one end of the dispensing apparatus 110 is a cleaning assembly 116 which is operative to discharge a solvent for the polyurethane foam over the face and discharge opening of the dispensing apparatus. One such solvent suitable for removing accumulated polyurethane foam from the face and discharge opening of the dispensing apparatus 110 is Carbitol solvent. The solvent is supplied to the cleaning assembly 116 from a solvent container 118 via a solenoid valve 120. The solvent can be dispensed from the solvent container 118 by any suitable means known to those skilled in the art such as by pressurizing the solvent container or by the incorporation of a mechanical pump.

There will now be described a general explanation of the operation of the automatic foam dispensing system 100. The conveying apparatus 104 indexes receptacles 106 to the work station 102 under the dispensing apparatus 110 which is now positioned over the receptacle 106 in a vertical direction facing downward. The dispensing apparatus 110 is mounted to a fixture 122 which allows movement of the dispensing apparatus over the receptacle 106 in a desired manner. The fixture 122 can be constructed of an assembly known to those skilled in the art, such as that disclosed in U.S. Pat. No. 4,196,160 which is incorporated by reference herein.

As the conveying apparatus 104 positions each receptacle 106 under the dispensing apparatus 110, a control system 124 activates the dispensing apparatus to discharge the polyurethane foam 112 into the receptacle so as to encapsulate the object 108. The fixture 122 is operatively moved such that the polyurethane foam 112 fills all voids in the receptacle 106 and completely encapsulates the object 108. The movement of the dispensing apparatus 110 by the fixture 122 may be by manual manipulation or by program control.

Upon filling of the receptacle 106 with polyurethane foam 112, the control system 124 terminates the foam dispensing operation and subsequently activates the solenoid valve 120 to provide a suitable solvent to the cleaning assembly 116. A small quantity, such as one-half millimeter of Carbitol, is discharged from the cleaning assembly 116 so as to dissolve accumulated polyurethane foam 112 from the discharge opening of the dispensing apparatus 110. The control system 124 is operative for controlling the intermittent discharge of the solvent by the cleaning assembly 116 at a desired interval.

The control system 124 can be further connected to a motor (not shown) for indexing the conveying apparatus 104 to move the receptacles 106 in a timed sequence to a respective work station 102 under a dispensing apparatus 110. Although the automatic foam dispensing system 100 has been described with reference to packaging objects, it is evident to one skilled in the art that such system may be incorporated for other purposes. For example, the automatic foam dispensin system 100 can be used for depositing polyurethane foam 112 into preshaped dies for forming shaped objects therefrom.

A description of the dispensing apparatus 110 for dispensing one or more fluids and which is particularly well suited, although not limited thereby, for mixing two liquids such as a liquid organic resin and a liquid polyisocyanate, which reacts to form a polyurethane foam 112, will now be described with reference to FIGS. 2 and 3. The dispensing apparatus 110 generally includes a barrel section 126 and a handle section 128. The barrel section 126 includes a head portion 130 and a hollow cylindrical portion 132. An axial bore 134 is formed in the head 130 and extends to communicate with the cylindrical portion 132. As shown in FIG. 3, a pair of liquid entry openings 136, 138 are formed in the head 130 on opposite sides to receive liquid injector terminals or connectors 140, 142 for the respective liquids.

A barrel assembly identified generally by the reference numeral 144 is removably assembled and positioned in the head 130 and the cylindrical portion 132 of the dispensing apparatus 110. The barrel assembly 144 comprises a movable piston 146, a substantially T-shaped reservoir member 148 having a shoulder 150 and a hollow shank member 152. A valving rod 154 is attached to the piston 146 and is slidably associated with the T-shaped reservoir 148 and shank member 152. The shank member 152 fits into the bore 134 of the dispensing apparatus 110. The inside of the shank member 152 defines a mixing chamber 156 for mixing of the two liquids to be discharged. One liquid inlet port 158 is formed on the side of the shank member 152 and a second liquid inlet port 160 is formed in the opposite side thereof.

The T-shaped reservoir member 148 includes a reservoir 162 for containing a cleaning fluid or solvent such as Cellosolve solvent. It will be appreciated that the section of the cylindrical portion 132 forward of the shoulder 150 of the T-shaped reservoir member 148 comprises a first chamber 164 which is substantially sealed from the chamber 166 defined in the remaining section of the cylindrical portion 132. The cleaning fluid may be introduced into chamber 164 of the cylindrical portion 132 through an aperture 168.

The piston 146 is pneumatically driven to move within the cylindrical chamber 166 and controls the movement of the valving rod 154. The valving rod 154 is attached to the piston 146 and extends forwardly through the T-shaped member 148. The piston 146 is provided with a recess bore 170 which receives a coil spring 172 having one end attached to the piston 146 at the base of the bore 170 and the other end attached to a sliding collar member 174 having a bore therethrough through which the valving rod 154 extends.

As best seen in FIG. 3, as the piston 146 is moved toward its forward position, the forward end surface of the collar 174 will engage the shoulder 150 causing the spring 172 to become fully compressed within the bore 170 of the piston 146. The means for moving the piston 146 and thus the valving rod 154, comprise a pressurized source of air. A full description of the nature of operation for moving the piston 146 by means of a pressurized source of air is provided in U.S. Pat. No. 4,023,733 which patent is hereby incorporated by reference.

Figure 2:
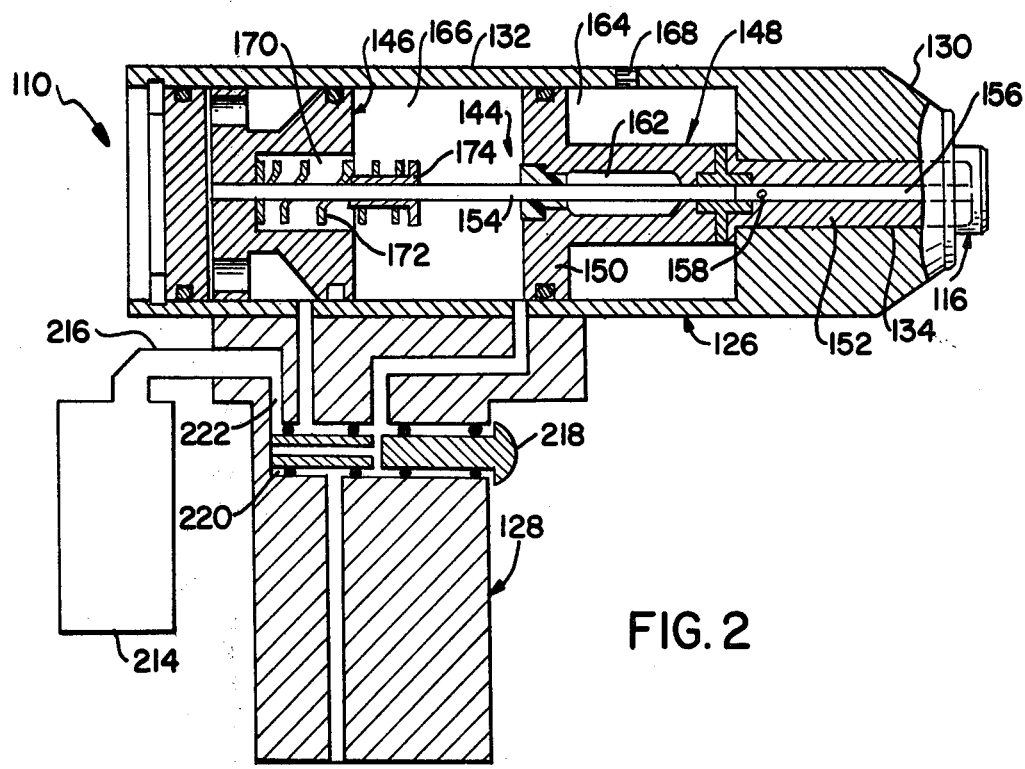
FIG. 2 is a partial cross-sectional side view of a fluid dispensing apparatus having a cleaning assembly constructed in accordance with the present invention positioned at one end of the dispensing apparatus and wherein the dispensing apparatus is shown in an operative position for discharging a first fluid therefrom.
Figure 3:
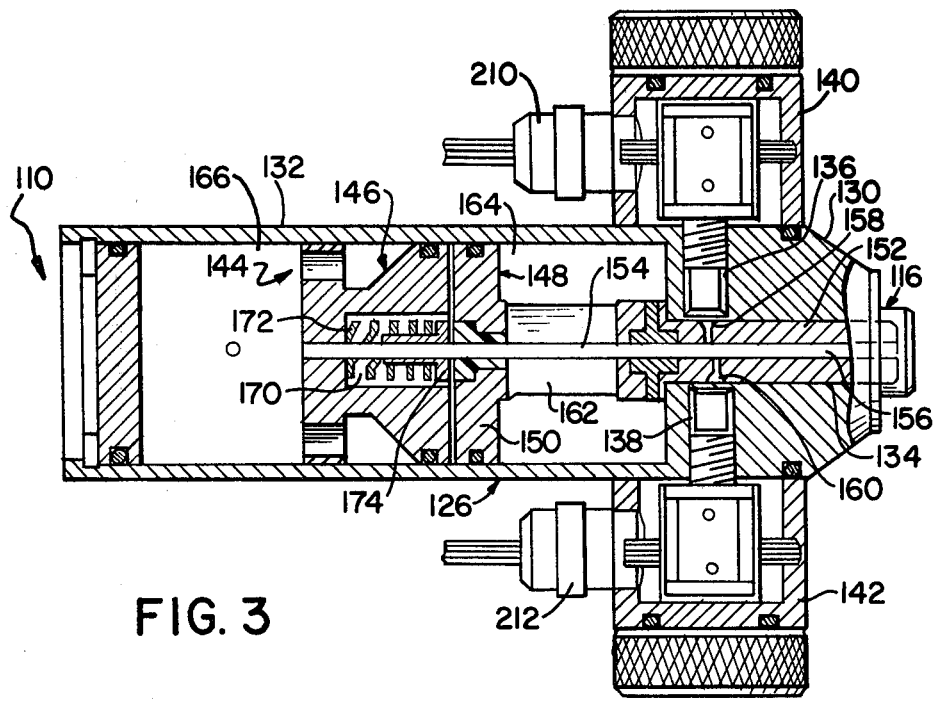
FIG. 3 is a partial cross-sectional side view of the dispensing apparatus as shown in FIG. 2 wherein the dispensing apparatus is shown in an inoperative position for discharging a fluid therefrom.

As shown in FIGS. 2 and 3, a cleaning assembly 116 in accordance with the present invention is secured to the head 130 of the dispensing apparatus 110 overlying the mixing chamber 156. The construction of the cleaning assembly 116 will now be described with reference generally to FIGS. 4–6. The cleaning assembly 116 is constructed from a body portion 176 having a flat surface 178 at one end thereof for mounting the cleaning assembly to the head 130 of the dispensing apparatus 110. The cleaning assembly 116 can be secured to the head 130 of the dispensing apparatus 110 by suitable attachment means such as screws 180. The cleaning assembly 116 is provided with a central opening 182 extending therethrough and which forms an axial bore 184 opening adjacent the flat surface 178 of sufficient size to receive a portion of the shank member 152 which protrudes beyond the head 130 of the dispensing apparatus 110. Surrounding the central opening 182 on the side of the body portion 176 opposite the flat surface 178, is formed a flat recessed area 186 having a groove 188 formed therein partially circumscribing the central opening 182. Provided within the side of the body portion 176 of the cleaning assembly 116 is an opening 190 communicating with the groove 188 and adapted to receive a fitting for securing a tube connected to a source for supplying solvent such as Carbitol thereto.

The cleaning assembly 116 is further provided with one or more passageways 192, 194 extending through the side of the body portion 176 and respectively communicating with a portion of the groove 188 such as at locations 193, 195. One end of the passageways 192, 194 communicate with the central opening 182 and the other end communicate with a threaded opening 196, 198 respectively. Each threaded opening 196, 198 is provided with a removable plug 200 which accommodates easy access to the passageways 192, 194 for cleaning and the like. A notch 202 is formed in the surrounding walls of the central opening 182 and communicates with each of the passageways 192, 194. A cap 204 is provided to be secured to the cleaning assembly overlying the flat recessed area 186. The cap 204 provides a fourth confining wall for the groove 188 which is formed in the flat recessed area 186. The cap 204 is provided with inclined walls 206 forming an opening 208 extending therethrough in communication with the central opening 182.

Figure 4:
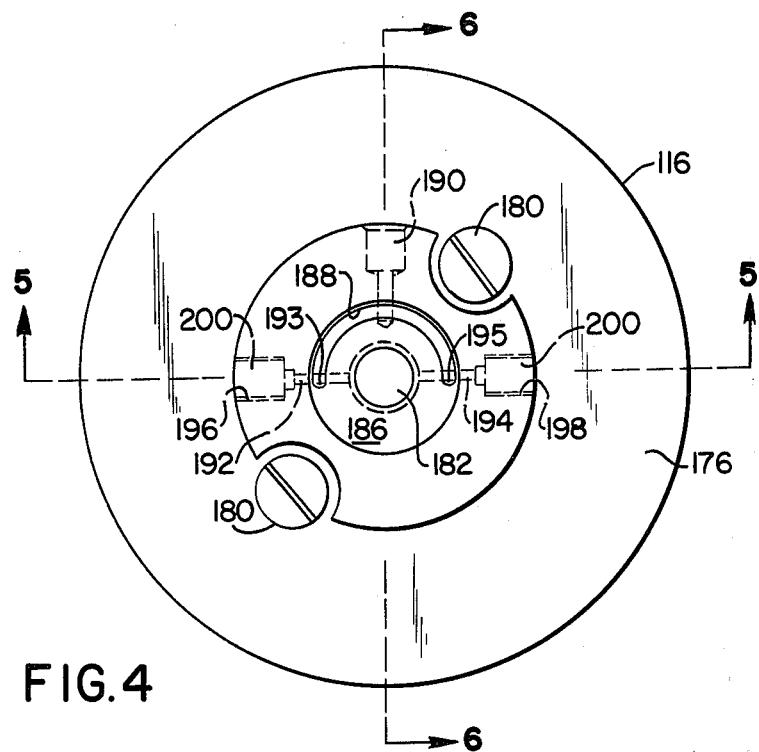
FIG. 4 is a front view of the cleaning assembly constructed in accordance with the present invention from a body having a pluraliy of passageways formed therein which communicates with a central opening extending through the body and a groove formed in the body at least partially circumscribing the central opening and communicating with each of the plurality of passageways.
Figure 5:
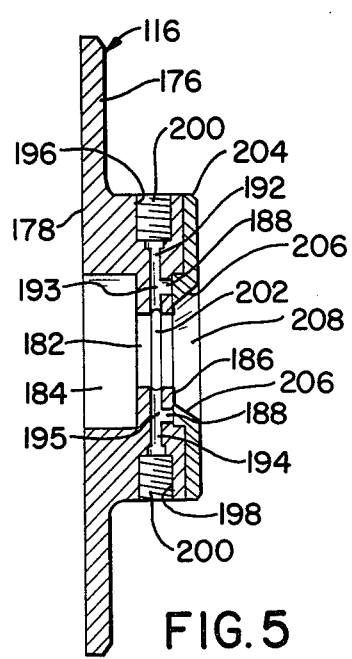
FIG. 5 is a cross-sectional side view taken along line 5—5 of the cleaning assembly as shown in FIG. 4 showing removable plugs provided in one open end of each passageway and further including a cap secured at one end of the assembly.
Figure 6:
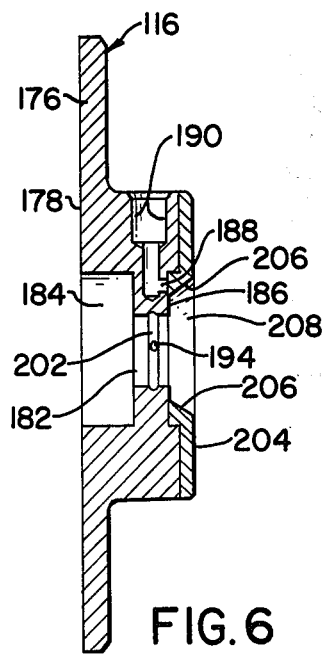
FIG. 6 is a cross-sectional top view taken along line 6—6 of the cleaning assembly as shown in FIG. 4, further showing the cap provided over the top surface of the body of the cleaning assembly and having an opening in alignment with the central opening of the body for communicating with the chamber of the fluid dispensing apparatus.

Although the cleaning assembly 116 has been described with reference to specific embodiments as illustrated in FIGS. 4–6, it is apparent to those skilled in the art that other modifications may be made without departing from the spirit and scope of the present invention. In particular, although two passageways 192, 194 are shown in axial alignment with each other, any number of passageways may be provided communicating at random locations with the central opening 182. In addition, each of the passageways 192, 194 may communicate with the groove 188 at other than the locations 193, 195. Still further, the groove 188 may be eliminated from the construction of the cleaning assembly 116 and the solvent may be suitably discharged into the central opening 182 by removing the plugs 200 and connecting a suitable solvent supply line thereto.

The operation of the dispensing apparatus 110 and cleaning assembly 116 in an automatic foam dispensing system 100 as generally shown in FIG. 1 will now be described. The cleaning assembly 116 is secured to the head 130 of the dispensing apparatus 110 such that the shank member 152 is received within the axial bore 184 of the cleaning assembly. The opening to the mixing chamber 156 of the dispensing apparatus 110 is in communication with the central opening 182 of the cleaning assembly 116 and in communication with the opening 208 of the cap 204. Thus, polyurethane foam 112 formed within the mixing chamber 156 of the dispensing apparatus 110 will be effectively discharged through the cleaning assembly 116 without obstruction.

The specific operation of the dispensing apparatus 110 will now be described with reference to FIGS. 2 and 3. In operation of the dispensing apparatus 10, a pressurized source of liquid organic resin 210 is coupled to the injection terminal 140 and a pressurized source of polyisocyanate 212 is coupled to the injection terminal 142. A source of pressurized gas 214 is connected to the inlet port 216. When the valving rod 154 is in the closed position, as shown in FIG. 3, its forward end exends past the inlet ports 158, 160 in the shank member 152 thereby preventing the flow of resin or polyisocyanate into the mixing chamber 156.

The trigger 218 of the dispensing apparatus 110 is maintained in the outward position by the pressure build-up in the cavity 220 from the gas source 214. In order to activate the dispensing apparatus 110 for mixing or spraying, the trigger 218 is pressed inward, see FIG. 2, to move the piston 146 to its rearward position. As the piston 146 moves backward, the valving rod 154 is retracted and moves past the input ports 158, 160 in the shank member 152, thereby permitting the inflow of pressurized resin and polyisocyanate. The valving rod 154 moves within the reservoir 162 except for the front end thereof which functions to seal off the reservoir by closing the back end of the mixing chamber 156 defined in the shank 152 from the liquid in rush. When polyisocyanate and organic resin flow into the mixing chamber 156, they will mix due to their respective pressure, will be forced or sprayed outward from the tip of the dispensing apparatus 110 and through the central opening 182 of the cleaning assembly 116.

When the dispensing apparatus 110 is in the dispensing cycle, which can be controlled by the control system 124, the forward portion of the valving rod 154 is immersed in the cleaning fluid of the reservoir 162. When it is desired to stop the dispensing, either the operator or some mechanical means releases the trigger 218, and the air pressure from inlet passageway 222 causes the trigger 218 to move forwardly to the outward position. When this occurs, the piston 146 and the valving rod 154 move forwardly, and the valving rod closes off the liquid inlet ports 158, 160. During this operation, the collar 174 holding the spring 172, engages the shoulder 150 and serves to compress the spring within the bore 170 of the piston 146. The solvent collected on the sides of the valving rod 154 cleans any residue of the polyisocyanate and polyurethane foam inside the dispensing apparatus 110.

The operation of the dispensing apparatus 110 can be controlled by the control system 124 in a manner known to those skilled in the art. Thus, as each receptacle 106 is indexed to the work station 102 under the dispensing apparatus 110, the control system will activate the dispensing apparatus to discharge polyurethane foam 112 therefrom and into the receptacle. As previously described, upon termination of the discharging of polyurethane foam 112 from the dispensing apparatus 110, often, the polyurethane foam will accumulate on the face of the dispensing apparatus such that the discharge opening therein becomes partially blocked causing sputtering or complete failure of the dispensing apparatus. This condition is particularly susceptible to any dispensing apparatus 110 incorporated in an automatic foaming dispensing system 100 which is positioned in a verticle orientation and subject to intermittent operation. In accordance with the present invention, the cleaning assembly 116 which is secured to the head 130 of the dispensing apparatus 110 overcomes or avoids the foregoing mentioned problem.

Subsequent to the discharge of polyurethane foam 112 from the dispensing apparatus 110, a small quantity of solvent, such as Carbitol, is supplied to the opening 190 in the cleaning assembly 116. As described in accordance with the automatic foam dispensing system 100 as shown in FIG. 1, a control system 124 is operative to open a solenoid valve 120 to allow the solvent within the solvent container 118 to be supplied to the cleaning assembly 116. The solvent is forced through the opening 190, into the groove 188, through the passageways 192, 194 and is discharged into the central opening 182. Upon discharge of the solvent within the opening 182, a small quantity of such solvent accumulates in the notch 202 which acts as a reservoir for the storage of such solvent between polyurethane foam dispensing cycles. The amount of solvent being discharged into the central opening 182 can conveniently be controlled by the control system 124 in connection with the solenoid valve 120. Thus, the discharging of solvent by the cleaning assembly 116 can be timed for intermittent discharging at the end of each polyurethane foam dispensing cycle. Other arrangements for causing a discharge of solvent by the cleaning assembly 116 can be incorporated other than that shown in FIG. 1 as apparent to those skilled in the art.

Accordingly, the solvent discharged in the central opening 182 of the cleaning assembly 116 is effective to remove any polyurethane foam which has accumulated on the face of the dispensing apparatus 110 which is not removed would partially block the dispensing apparatus so as to cause sputtering or complete failure thereof. Thus, it can be appreciated that the cleaning assembly 116 in accordance with the present invention has been adapted for use with a dispensing apparatus 110 which is operative to intermittently remove accumulative foam from the discharge opening of the dispensing apparatus which would otherwise partially or completely prevent the satisfactory operation of the dispensing apparatus. Further, the cleaning assembly 116 can be easily installed on the dispensing apparatus 110 and is economical to use and in addition will not interfere with the operation of the dispensing apparatus.

In accordance with the present invention, there has been presented a cleaning assembly 116 for use with a foam dispensing apparatus 110. The cleaning assembly 116 comprises a body portion 176 adapted to be secured to one end of the foam dispensing apparatus 110. The body portion 176 includes a central opening 182 extending therethrough to be arranged in communication with a mixing chamber 156 in the dispensing apparatus 110 from which a polyurethane foam 112 is formed by the mixing of a plurality of fluids in the mixing chamber and discharged therefrom. At least one passageway, i.e., 192, 194, is formed in the body portion 176 in communication with the central opening 182 for discharging a solvent for the polyurethane foam 112. The passageway, i.e., 192, 194, is arranged for discharging the solvent into the central opening 182 for removing polyurethane foam 112 discharge from the mixing chamber 156 which has accumulated on the face of the dispensing apparatus.

Although the invention herein has been described with reference to particular embodiments, it is to be understood that these embodiments are merely illustrative of the principals and application of the present invention. It is to be understood that numerous modifications may be made in the illustrative embodiments and other arrangements may be devised without departing from the spirit and scope of the present invention as defined by the appended claims.

What is claimed is:

1. A cleaning assembly for use with a fluid dispensing apparatus comprising dispensing means positioned adjacent the face of a dispensing apparatus, said dispensing apparatus having a port in said face in communication with a chamber in said dispensing apparatus from which a first fluid is discharged, said dispensing means comprising a body having a surface forming an opening extending therethrough in alignment with said port of said dispensing apparatus and a groove formed in said surface adjacent said port to provide a reservoir within said opening for retaining a quantity of a second fluid discharged from said dispensing means, said dispensing means discharging said second fluid onto said face within said opening for preventing said first fluid discharged from said chamber from accumulating on said face at said port.

2. The cleaning assembly as set forth in claim 1 wherein said dispensing means includes at least one passageway having an opening in communication with said face for discharging said second fluid thereon.

3. A cleaning assembly as set forth in claim 1 wherein said dispensing means includes a plurality of passageways, each passageway having an opening in communication with said face for discharging said second fluid thereon.

4. The cleaning assembly as set forth in claim 3 wherein said dispensing means further includes means in communication with each of said plurality of passageways for discharging said second fluid therethrough.

5. A cleaning assembly for use with a foam dispensing apparatus comprising, dispensing means for discharging a solvent secured adjacent the face of a foam dispensing apparatus, said dispensing apparatus having a port in said face in communication with a mixing chamber in said dispensing apparatus from which a foam formed by the mixing of a plurality of fluids in said mixing chamber is discharged, said dispensing means comprising a body having a wall forming an opening extending therethrough in alignment with said port of said dispensing apparatus, a plurality of passageways formed in said body for discharging a solvent onto said face of said dispensing apparatus, and a groove formed in said body at least partially circumscribing said opening and in fluid communication with each of said plurality of passageways, said groove adapted for supplying said solvent through each of said passageways and onto said face of said dispensing apparatus within said opening for preventing said foam discharged from said mixing chamber from accumulating on said face at said port.

6. The cleaning assembly as set forth in claim 5 further including a notch formed in the wall forming said opening in said body, said notch communicating with said passageways to provide a reservoir for retaining said solvent in said opening of said body.

7. A cleaning system for use with a fluid dispensing apparatus comprising, a dispensing apparatus having a chamber from which a first fluid is discharged, a cleaning assembly positioned adjacent a discharge port of said dispensing apparatus through which said first fluid is discharged from said chamber, said cleaning assembly comprising a body having an opening iin alignment with said discharge port of said dispensing apparatus, and dispensing means within said body for discharging a second fluid onto said discharge port for preventing said first fluid discharged from said chamber from accumulating thereon, said dispensing means comprising a plurality of passageways formed in said body for discharging said second fluid therethrough and onto said discharge port of said dispensing apparatus and a groove formed in said body in fluid communication with each of said passageways at least partially circumscribing said opening for supply said second fluid to each of said passageways.

8. The cleaning system as set forth in claim 7 wherein said first fluid includes a synthetic foam.

9. The cleaning system as set forth in claim 8 wherein said second fluid includes a solvent for said synthetic foam.

10. The cleaning system as set forth in claim 7 wherein said dispensing apparatus is positioned in a vertical orientation such that said first fluid is discharged therefrom in a downward direction.

* * * * *